April 30, 1968     M. E. HILL     3,380,093
BATTERY-POWERED SCOURING APPLIANCE
Filed March 24, 1966     3 Sheets-Sheet 1
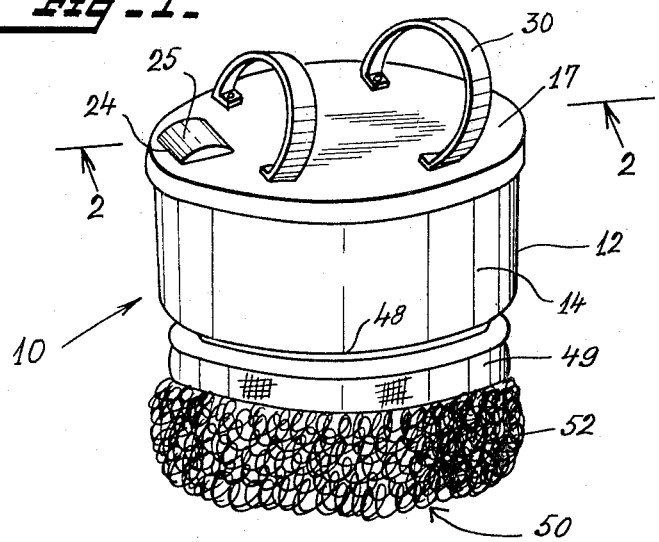
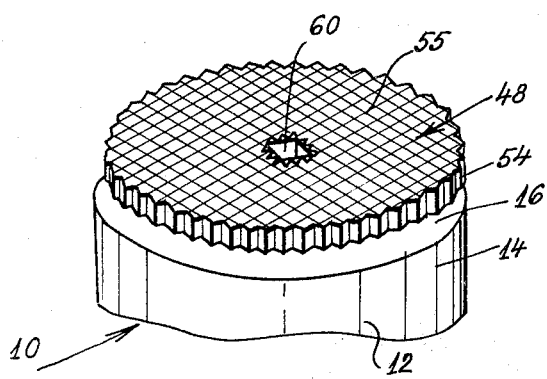
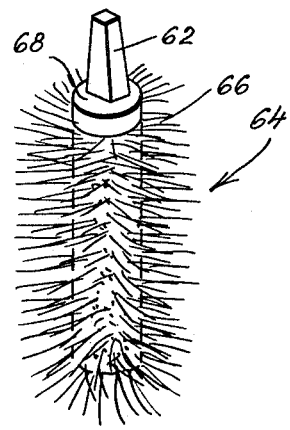
INVENTOR
Mary E. Hill
BY Polachek & Saulsbury
ATTORNEYS April 30, 1968 M. E. HILL 3,380,093
BATTERY-POWERED SCOURING APPLIANCE
Filed March 24, 1966 3 Sheets-Sheet 2
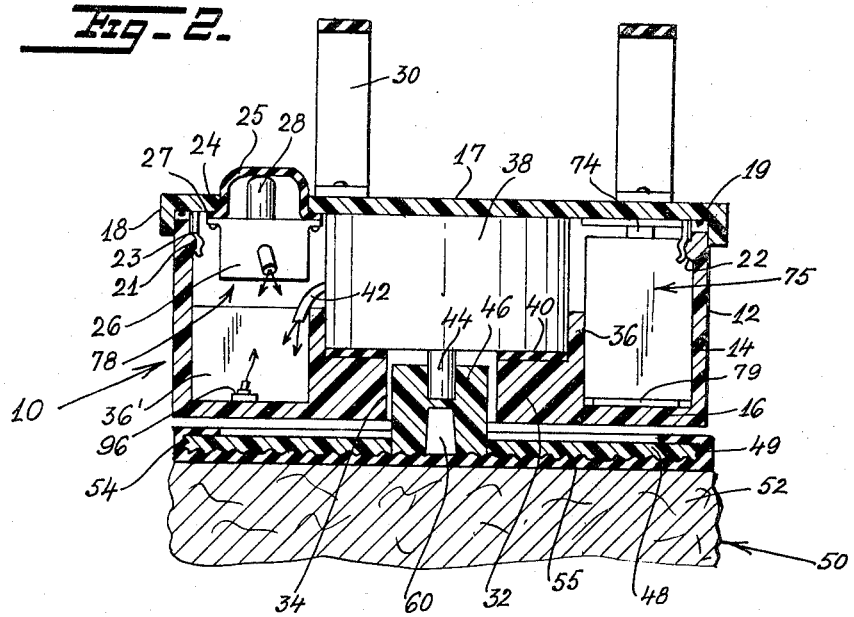
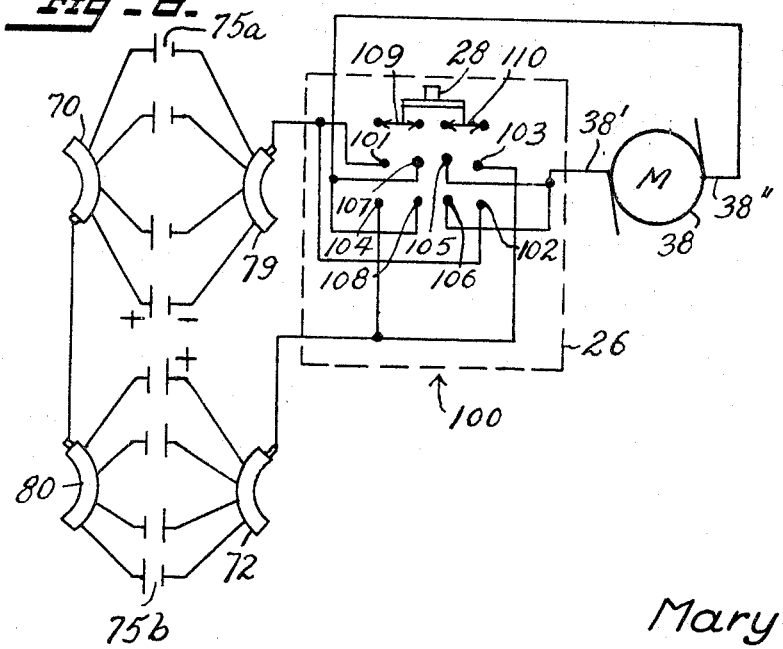
INVENTOR
Mary E. Hill
BY Polachek & Saulsbury
ATTORNEYS

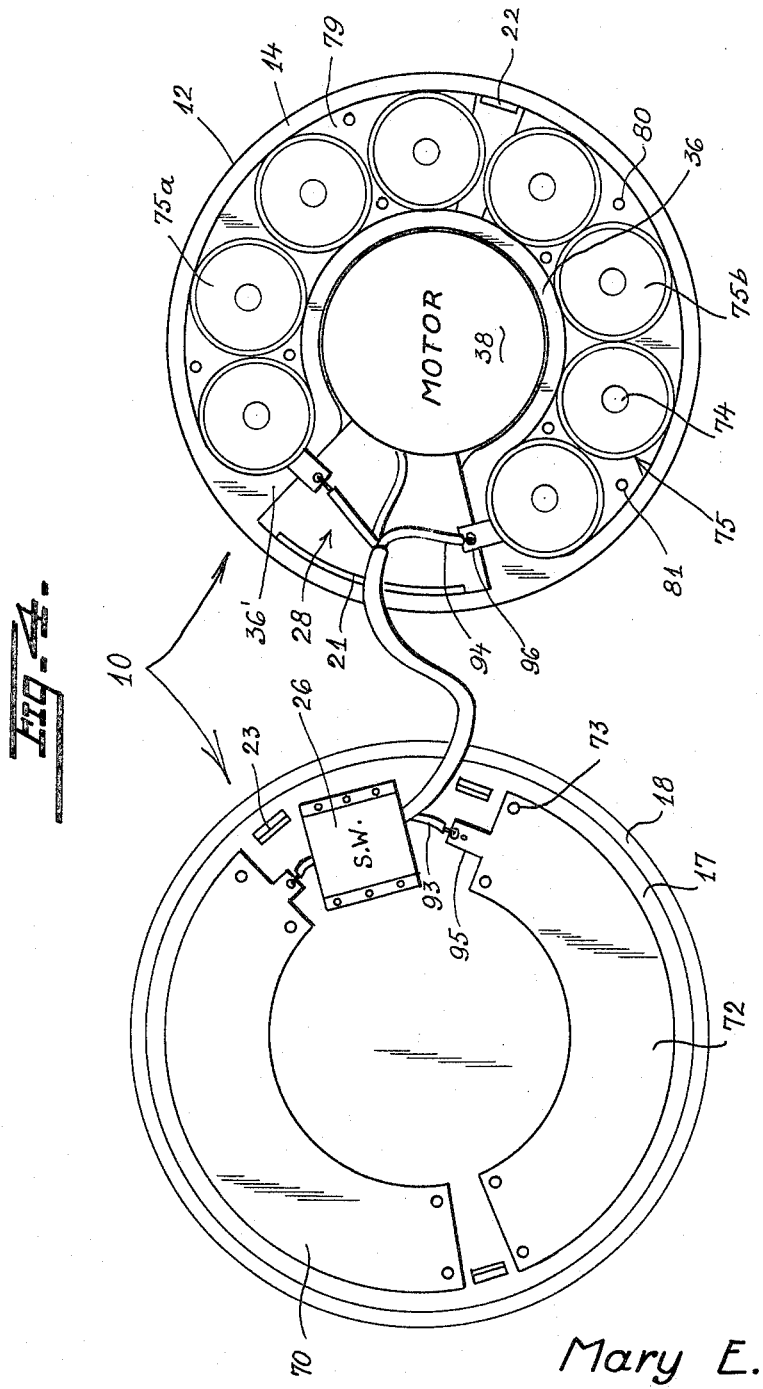

United States Patent Office 3,380,093
Patented Apr. 30, 1968

3,380,093
BATTERY-POWERED SCOURING APPLIANCE
Mary E. Hill, Bronx, N.Y., assignor of one-half to
Lucinda Carter, Jamaica, N.Y.
Filed Mar. 24, 1966, Ser. No. 537,123
6 Claims. (Cl. 15—23)

ABSTRACT OF THE DISCLOSURE

Motorized appliance for securing pots, pans and other utensils that can be held in the user's hand, which appliance is entirely self-contained and not connected to any external power source. The appliance has a shallow hollow cylindrical housing with a battery-operated motor therein. The housing has a circular bottom wall mounting an external disk for supporting a scouring member. The disk is operatively connected to the motor and is driven thereby. Switch means are provided for controlling the motor.

---

This invention relates generally to the art of electrical appliances and more particularly concerns a motorized, battery-driven scouring appliance for pots, pans and other utensils.

It is a principal object of the invention to provide a compact motorized appliance which can be held in the user's hand for cleaning utensils of various types, the appliance being entirely self contained and not connected to any external power source.

A further object is to provide an appliance as described, with means for reversing or oscillating the drive of scouring member to effect more thorough scouring action.

Another object is to provide an appliance as described, with removable and replaceable scouring members so that the appliance can be selectively used for scouring large utensils such as pots and pans or long narrow articles such as bottles and jars.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of an appliance embodying the invention.

FIGURE 2 is a vertical sectional view on an enlarged scale taken on line 2—2 of FIGURE 1.

FIGURE 3 is a fragmentary perspective view of the appliance shown in an inverted position with scouring member removed.

FIGURE 4 is a top plan view of the appliance in an open position with cover shown in an inverted position, and cover sealing gasket removed.

FIGURE 5 is a perspective view of a rotary brush which can be used as a scouring member on the appliance.

FIGURE 6 is a diagram of the electrical circuit of the appliance.

Referring first to FIGURES 1-4, there is shown appliance 10 comprising a shallow cylindrical housing or casing 12 with a cylindrical side wall 14, circular bottom wall 16 and open top. The open top of the housing is closed by a removable circular cover 17 having a cylindrical skirt 18 extending around the top of wall 14 and fitting snugly thereat. A resilient ring gasket 19 may be inserted between the flat upper annular side of wall 14, and the underside of the cover to insure a waterproof seal.

In order to hold the cover 17 on the housing, there are provided three spaced leaf springs 23 secured to the underside of the cover and engaged with arcuate beads 21 and 22 extending inwardly from wall 14.

An opening 24 is formed in the cover near its periphery. In this opening is sealed a flexible diaphragm 25 which covers a switch 26 secured to the underside of the cover. The operating arm 28 of the switch extends upwardly through opening 24 to the underside of the diaphragm so that the switch can be operated by pressing the arm 28 inwardly of the housing with the diaphragm disposed therebetween. This arrangement is provided to insure that switch 26 is protected from moisture. The rim 27 of the diaphragm can be fused or cemented to the rim of opening 24.

In order to provide a secure manual hold on the appliance, two flexible straps 30 are secured to the top of the cover. They are secured to opposing peripheral points of the cover.

Inside the housing 12 there is provided a raised centrally located platform 32 having a central opening 34 and a peripheral axially extending wall 36; see FIGURES 2 and 4. On the annular top of platform 32 is securely mounted a cylindrical electric motor 38. A sealing gasket 40 can be interposed between the underside of the motor and the top of the platform. The motor has a laterally extending cable 42 connecting the motor into the electric circuit of the appliance. The motor has an axially extending shaft 44 located in opening 34 of platform 32. On this shaft is secured hub 46 of disk 48. The hub extends through opening 34 and disk 48 is slightly spaced from the bottom end of the casing. On the rim of disk 48 is removably secured the elastic cylindrical skirt 49 of a scouring member 50. This member has a scouring body 52 made of steel wool or other fibrous material secured to skirt 49. Disk 48 has a serrated or roughened rim 54 and a serrated or roughened bottom surface 55 as clearly shown in FIGURE 3. By this arrangement the scouring member is held frictionally and nonrotatably on the disk while the disk is rotated when the motor shaft turns. The roughened surfaces of disk 48 serve another important purpose. These surfaces can be used as abrasive means for scouring away stubborn stains in a pot or other utensil. To use the appliance for this purpose the scouring member 50 will be snapped off the disk to expose the disk.

A noncircular blind tapered recess 60 is formed at the center of the bottom of disk 48. This recess receives the noncircular tapered key 62 provided at the end of a brush 64 shown best in FIGURE 5. The bristles 66 of the brush extend radially outward of central spine 68 and key 62 extend axially upward from the spine. To use the brush the scouring member 50 with fibrous body 52 will be removed from disk 48.

The electric circuit of the appliance includes a pair of arcuate metal plates 70, 72 secured to the underside of the cover by pins 73. The plates are circumferentially spaced from each other. These plates are located to contact positive terminals 74 of a plurality of batteries 75 removably inserted in the housing between wall 36 of platform 32 and wall 14. Wall 36 of the platform has two circumferentially spaced radial portions 36' extending between the platform and wall 14 to define a cavity 78. The switch 26 fits into this cavity. At the bottom of the housing between wall 14 and the platform 32 are two other arcuate metal plates 79, 80 secured by pins 81 to the bottom 16 of the housing. These plates are spaced apart circumferentially of the housing and are contacted by the negative terminals of the batteries. As best shown in FIGURE 4 the batteries are arranged in two groups 75a, 75b, of four each. Four of the batteries in group 75a are contacted by plates 70, 79. The four batteries in the other group 75b contacted by plates 72, 80. Wires 93, 94 are connected to tabs 95, 96 at ends of the plates.

FIGURE 6 shows the electric circuit 100 of the appliance 10. Batteries 75a are shown connected in parallel to contact plates 70 and 79. Batteries 75b are shown connected in parallel to contact plates 72 and 80. Battery group 75a is connected in series with group 75b since plates 70 and 80 are connected together. Plate 79 is connected to diagonally opposite contacts 101 and 102 of switch 26 which is a normally open pushbutton type of double pole, two-position switch. Contact terminals 103 and 104 of the switch are connected to plate 72. Motor 38 has one terminal 38' connected to switch contact terminals 105 and 106. The other terminal 38" of the motor is connected to switch contact terminals 107 and 108.

In operation of the appliance, it is necessary to close switch 26 by pressing down on operating arm 28. This will move poles 109 and 110 to bridge contacts 101, 107 and 103, 105 first. Motor shaft 34 will then be driven in one direction. By pressing the operating arm 28 down further, the motor will reverse since the switch position will be changed to reverse the connections of the motor terminals to the battery terminals, as pole 109, 110 bridge contacts 104, 108 and 102, 106 respectively.

The scouring member 50 can be snapped off at any time and can be replaced with brush 64. Alternatively the appliance can be used without either the scouring members 50 or 64, since disk 48 will then serve as a scouring member.

The batteries for driving a motor which in turn can be manually controlled to turn it on and off. The batteries can easily be removed by snapping off the cover 17 which can be quickly replaced after the batteries are replaced. The batteries are arranged series-parallel in the groups 75a and 75b so that if any one or more batteries in any group become weak, the rest of the batteries can carry the load for a limited time until the weak batteries can be replaced.

The appliance can be manufactured at relatively low cost. It is easy to use and entirely safe. Scouring members are easily removed and replaced and interchanged. The appliance is neat and attractive in appearance and will fulfill a long felt need in the field of cleaning appliances.

While I have illustrated and described the preferred embodiment of my invention, it is to be understood that I do not limit myself to the precise constructions herein disclosed and that various changes and modifications may be made within the scope of the invention as defined in the appended claims.

What is claimed is:

1. An appliance for scouring utensils, comprising a generally cylindrical, shallow housing having a cylindrical side wall, a closed bottom circular wall and open top, a circular cover removably mounted on the open top of the housing and closing the same in waterproof sealed relationship, an electric motor in the housing, said motor having a shaft extending axially downward, said circular bottom wall of the housing having a central opening, a disk disposed outside of and in axial alignment with the housing and slightly spaced from the bottom wall for carrying a scouring member, a hub carrying the disk, said hub extending axially through said central opening and operatively connected to said shaft for rotation thereby, first contact members carried by the cover at the underside thereof, other contact members mounted in stationary positions in the housing and spaced from the first contact members for engaging batteries therebetween, switch means carried by the cover, said cover having an opening therein, switch means having an operating arm movable through the opening in the cover, and electric conductors connecting the switch means, contact members and motor in an electric circuit, so that the motor is energized when the operating arm of the switch means is manually moved.

2. An appliance as recited in claim 1, further comprising straps on the outside of the cover to facilitate manual holding of the appliance.

3. An appliance as recited in claim 1, further comprising a flexible diaphragm overlaying the operating arm of said switch means and sealed at its rim to the rim of the opening in the cover so that the switch means is protected against moisture.

4. An appliance as recited in claim 1, wherein said disk has a roughened outer surface for holding a scouring member frictionally and nonrotationally on the disk and for use as abrasive means when the scouring member is removed from the disk.

5. An appliance as recited in claim 1, wherein said hub has a noncircular recess for removably receiving the noncircular key of an elongated other scouring member.

6. An appliance as recited in claim 1, wherein said switch means is a pushbutton type of normally open double pole switch having two operating positions, said switch having contact terminals connected to the motor in a reversing circuit so that the motor shaft is driven in one direction when the switch is in one position and is driven in an opposite direction when the switch is in a second position.

References Cited

UNITED STATES PATENTS 2,935,072  5/1960  Jones et al. _____ 15—22
3,293,678  12/1966  South _____ 15—29

CHARLES A. WILLMUTH, *Primary Examiner.*

EDWARD L. ROBERTS, *Assistant Examiner.*